Oct. 25, 1966     T. B. PAVLOVICH     3,280,924
VIBRATING MACHINE FOR PLUNGING PILES, THINWALLED
CYLINDRICAL CASINGS AND PLATES
Filed March 13, 1961     5 Sheets-Sheet 1

INVENTOR
TATARNIKOV B. PAVLOVICH
BY Glascock, Downing and Seebald
ATTORNEYS

Oct. 25, 1966 T. B. PAVLOVICH 3,280,924
VIBRATING MACHINE FOR PLUNGING PILES, THINWALLED
CYLINDRICAL CASINGS AND PLATES
Filed March 13, 1961 5 Sheets-Sheet 3

INVENTOR
TATARNIKOV B. PAVLOVICH
BY Hancock, Downing & Seebold
ATTORNEYS

Oct. 25, 1966    T. B. PAVLOVICH    3,280,924
VIBRATING MACHINE FOR PLUNGING PILES, THINWALLED
CYLINDRICAL CASINGS AND PLATES
Filed March 13, 1961    5 Sheets-Sheet 4

INVENTOR
TATARNIKOV B. PAVLOVICH

BY Hancock, Downing & Seebold
ATTORNEYS

Oct. 25, 1966 T. B. PAVLOVICH 3,280,924
VIBRATING MACHINE FOR PLUNGING PILES, THINWALLED
CYLINDRICAL CASINGS AND PLATES
Filed March 13, 1961 5 Sheets-Sheet 5

INVENTOR
TATARNIKOV B. PAVLOVICH
BY *Hancock Dorning & Sebold*
ATTORNEYS

United States Patent Office 3,280,924
Patented Oct. 25, 1966

3,280,924
VIBRATING MACHINE FOR PLUNGING PILES, THIN-WALLED CLINDRICAL CASINGS AND PLATES
Tatarnikov Boris Pavlovich, Admiralteiskaia naberezhnaia 10, Apt. 17, Leningrad, U.S.S.R.
Filed Mar. 13, 1961, Ser. No. 133,535
4 Claims. (Cl. 175—55)

This invention relates to a vibrating machine for driving piles, thin-walled cylindrical casings and plates.

The erection of a great number of various structures requires sinking into the ground of prismatic and tubular rods (piles), hollow cylinders (well drilling) and plates (for setting up retaining walls).

Piles are usually driven by steam hammers or by a freely dropping weight (mechanical hammer) by hoisting such weight to the proper height with the help of a winch (dynamic method). The retaining walls are also usually erected as sectional ones by means of sheet piling, by the dynamic method, i.e. by hammers. The hollow cylinders (drilling wells) being heavier in comparison with piles are sunk into the soil under their own weight provided that the ground is removed below the cylinder (static method). The drilling wells are thick-walled to make their weight heavier than the frictional forces developing between the soil medium and the external surface of the well. Soil excavation in the drilling wells under complex hydrologic conditions is effected under compressed air (caisson method).

The most up-to-date and progressive method in addition to those mentioned above is the vibrating method for sinking piles and thin-walled casings (drilling wells). The essence of this method is that the vibrating machine is rigidly fastened on the member to be sunk. When the machine operates, it vibrates the system (the sunk member-vibrating machine). Under the action of the vibrations and the weight of the system, the member is sunk into the ground. The vibrating machine may be designed to create different forms of vibration of the sunk member, such as transverse, vertical, torsional, etc. The nature of the vibrations of the system depends on the shape and type of unbalanced moving masses in the system.

The conventional vibrating machines employing vertical action are so designed that they create a frequency of forced vibration of the member to be embedded 2 to 4 times greater than the natural frequency of vibration of the member, such as that of a solid in the soil medium and this is why they are called high frequency vibrating machines.

The experience of operation shows that the high-frequency vibrating machines are capable of driving into the ground only light piles and primarily sheet piles into sands saturated with water. Such machines due to the great acceleration of vibration of the system reaching the magnitude from 9 to 13 c.p.s. are of very restricted durability and require high power during operation. The restricted sinking ability of these machines is due to the fact that the amplitude of forced vibration of the system is inadequate for the creation of residual deformation in the soil medium under the end planes or faces of the member to be embedded.

Such deficiencies of high frequency vibrating machines are eliminated in the low-frequency vibrating machines described hereinafter and, a peculiar feature of which machines is that the amplitude of forced vibrations of the system (sunk member-low frequency vibrating machine) is quite sufficient to create residual deformations in the soil medium under the end plane or face of the member, the same being achieved due to the large moment of unbalanced masses of the vibrating machine, as well as due to the fact that the frequency of vibrations is given within the range of natural frequencies of the member as a solid in the soil medium, i.e. the use of the resonance phenomenon. Hence, the suggested low frequency vibrating machines are of a direct resonance type unlike those described above (existing high frequency non-resonance vibrating machines of a directed type).

The natural frequency of the system is found approximately from the formula of the classic theory of vibrations:

$$K=\frac{60}{2\pi}\frac{CF}{m}$$

where $K$ = natural frequency of vibration of the system per minute
$C$ = elasticity of the soil medium in kg./cm$^3$.
$F$ = transverse area of the sunk member in cm.$^2$
$m$ = mass of the system in $$\frac{\text{kg. sec.}^2}{\text{cm.}}$$

$\pi$ = 3.14

The natural frequency of piles, pipes and plates as solids in the soil medium is estimated from 240 to 450 oscillations per minute or from 4 to 7.5 c.p.s. On this basis and utilizing the resonance phenomenon, the proposed low frequency vibrating machines of direct action possess a speed of rotation of eccentric masses mounted on shafts from 240 to 450 revolutions per minute as well (or from 4 to 7.5 c.p.s.).

The range of idle running of the system (sunk member-vibrating machine) is estimated from the formula:

$$A_x=\frac{M}{G_B+G_C}$$

where $A_x$ is the range of idle running of the system in cm.;
$M$ is the static moment of the eccentric force in kg. cm.;
$G_B$ and $G_C$ are the dead weight of sunk member and vibrating machine in kg.

The amplitude of idle running of the system is 1 to 3 cm.

Under such conditions, the possibility is achieved for driving not only light piles into sands saturated with water but also for driving heavy piles into sand, clay, clayloam, etc. In addition, due to the decrease in the acceleration of oscillation of the system to 3 c.p.s., low frequency vibrating machines attain higher durability and lower power consumption during operation.

The proposed electromechanical low frequency (resonance type) vibrating machine of direct action for driving piles, thin-walled cylinders and plate-casings from the constructional point of view is designed according to the shape of the member to be embedded.

An object of the present invention is to provide a vibrating machine of direct vertical action designed for driving pile into the ground, such machine consisting of an electric motor mounted on the body of a vibrator of a four-shaft member system and a conical self-wedging device including a cone on the member to be driven and such cone being adapted to be inserted into a conical socket connected with the body of the vibrating machine. The cone is connected with the pile and is designed for ensuring a rigid fastening of the pile with the vibrating machine. For the purpose of utilizing the resonance phenomenon for making the lowering of vertical and inclined piles more effective, the frequency of vibrations is assumed to be 6.5–7.5 c.p.s. depending on the weight of the pile and properties of the soil, with the amplitude of idle running of the system being equal to 1 to 3 cm.

The vibrating machine for lowering thin-walled cylinder-casings into the soil consists of two low frequency (resonance type) vibrators, each having one shaft with a frequency of vibration of 4–5 c.p.s., the vibrators being synchronized and mounted on one housing which is provided with a central well designed for the removal of the soil below the cylinder of the casing to be sunk with, the range of idle running of the system being equal to 1 to 3 cm.

For sinking into the ground of thin-walled plate-casings, the vibrator is provided with a frequency of vibration equal to 4–5 c.p.s., the range of idle running of the system being equal to 3 cm. and being designed in the form of an electric motor with the shaft thereof extending from each end mounted on a bed plate, two reducers connected with the respective ends of the electric motor shaft and carrying two counterweights on the ends of the driven (transverse) shaft of reducer.

The above described vibrating machine may be utilized for sinking shafts. In this case the vibrating machine may be mounted for instance on lattice structures within a metal or reinforced concrete jacket located in the face of the shaft and being used in such case as a sinking vibrating shield above which the sectional lining of the pit shaft consisting of rings or tubings is arranged.

Further objects and advantages of the invention will be appreciated from the description and drawings attached hereto.

The drawings show several embodiments of the vibrating machine.

Figure 1:
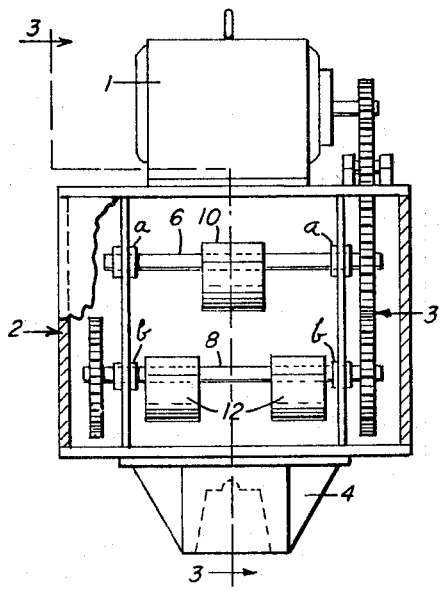
FIG. 1 shows schematically in elevation and partly in cross section an embodiment of a low-frequency vibrating machine for sinking piles into the soil.

In FIGS. 1–4, the machine for driving piles includes an electric motor 1 rigidly secured to body 2 of a vibrator of the vertically directed type. The body 2 is preferably made of welded steel sheets, and is provided at the bottom thereof with a self-wedging device 4 adapted to fastly secure the vibrating machine to the top or upper end surface of a pile when the pile is being driven into the soil. Supported by the body 2 are upper and lower pairs of shafts 5, 6 and 7, 8, respectively. The shafts 5, 6 and 7, 8 are journalled in anti-friction bearings *a, b* respectively, as perhaps best shown in FIGURE 1. The shafts 5, 6 have secured thereto eccentrics 9, 10 and shafts 7, 8 have eccentrics 11, 12, respectively.

Figure 2:
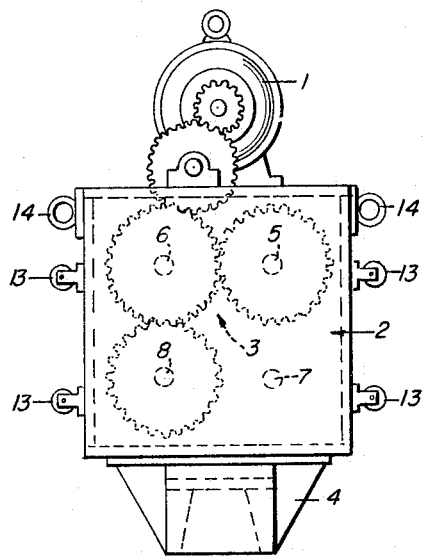
FIG. 2 is a side elevation of the device shown in FIG. 1.
Figure 3:
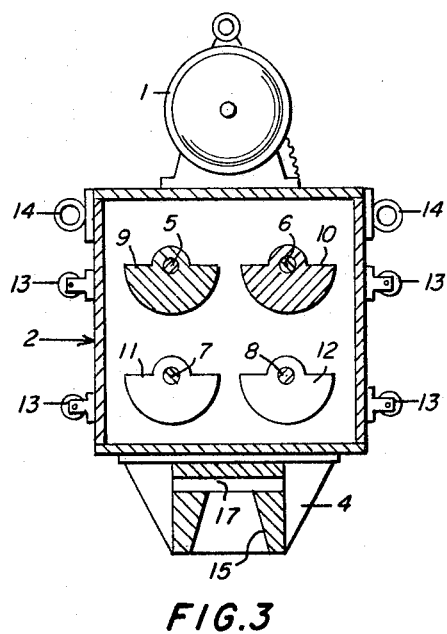
FIG. 3 is a section taken along line 3—3 of FIG. 1.
Figure 4:
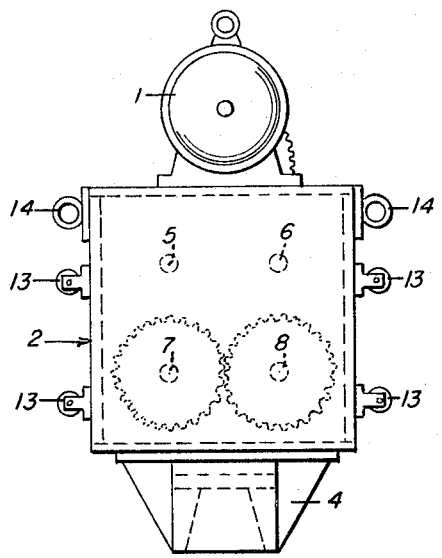
FIG. 4 is a side elevation of the device shown in FIG. 1.

The shafts 5, 6 and 7, 8 are adapted to be driven by the shaft of motor 1 through a reducing gear assembly 3, as clearly illustrated in FIGS. 1 and 2. When the machine is mounted on a pile and in operation, it develops vertical oscillations (vibrations) of the mass of the system, due to the displacement of the center of gravity along the vertical line resulting from the rotation of the shafts 5, 6 and 7, 8. The shafts of each of such pairs rotate in different directions at the same speed, and the eccentrics on each shaft have equal static moments in relation to the center lines of the shafts. The speed of rotation of the upper and lower pairs of shafts is the same and for the purpose of utilizing the resonance phenomenon is taken from 6.5 to 7.5 c.p.s.

In conformance with the embodiment in FIGS. 1, 2, 3 and 4, a vibrating machine may be designed, differing by the output of the motors, by the moment of unbalanced masses, by the speed of rotation of the shafts and designed for driving different piles into the soil, weighing from 0.5 to 6 tons. The carrying capacity of the pile driven into different soil is from 25 to 250 tons.

The pinion of the reducing gear assembly and the bearings of the shaft may be lubricated in any convenient and desired manner. The outer sides of the body include four guide rollers 13 which are required to operate the machine on the leaders of pile drivers, and four eyebolts 14 are provided to enable the machine to be attached to a sling (not shown).

The self-wedging device 4 includes a conical socket 15 adapted to receive a metal cone attached to a bed plate rigidly secured to the pile to be driven (not illustrated). In order to disconnect the cone from the socket 15, a wedge (not shown) can be inserted into opening 17 in the device 4 and by driving the wedge in the opening by a hammer or other percussive tool, the cone will be separated from the socket. This step is preferably achieved while the hoisting cable is tightened and the vibrator operating at low speed.

Low-frequency (resonance) vibrating machines may be used not only for driving piles but for sinking casings weighing up to 40 tons into sand, combined with the removal of soil below the sunken casing. In practice, it is possible to achieve the driving of heavier casing into different soils.

Figure 5:
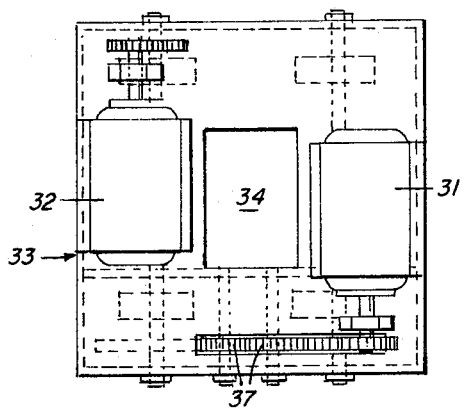
FIG. 5 is a schematic plan view of a constructional embodiment of a low-frequency vibrating machine designed for driving thin-walled cylinder-casings into the soil.
Figure 6:
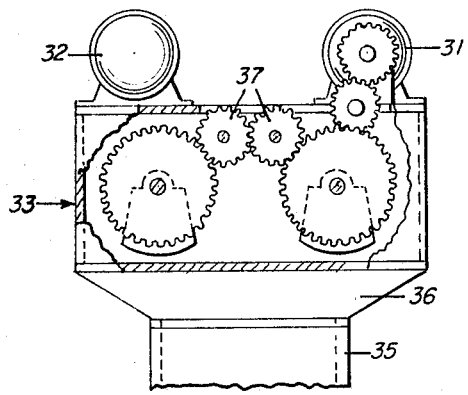
FIG. 6 is a side elevational view of the machine of FIG. 5.
Figure 7:
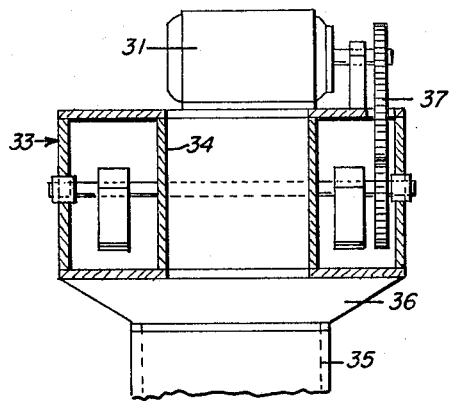
FIG. 7 is an end view of the machine of FIG. 5.

In order to drive a heavier casing into the soil the vibrating machine is provided with two unbalanced single-shaft motors 31 and 32 (see FIGS. 5, 6 and 7) carried by one body 33. In the middle of body 33, there is provided an opening 34 serving for the removal of the soil below the sunken casing by suitable means. The opening 34 is also adapted to be used for lowering pressure pipes (not shown) to break down the soil in the casing while the vibrating machine is in operation. The machine is secured on casing 35 to be sunk by means of flange 36 with bolts or the like.

Synchronous operation of both motors is achieved by a mechanical connection of the motor shafts through idler gears 37 and by an electrical connection from the side of the rotors and stators of asynchronous electric motors under a common starting resistance.

In erecting embankments, moorings, and revetments of canals, locks and cut-off walls, ordinary piles or sheet piles are driven into the ground by the mechanical or vibrating method. In this way, walls are erected in the soil. A low-frequency vibrating machine makes it possible to drive into the ground, in lieu of sheet piles or ordinary piles, a thin-walled reinforced concrete plate-casing which by its shape in two dimensions corresponds to the shape of a number of sheet piles of Larsen's type united in one line. The upper part of such plate-casings must be provided with a rigid girder on which the vibrating machine is fixed.

The success of this embodiment has been proven by the experience gained as a result of the driving into the ground of thin-wall reinforced concrete cylinder-casings. For example, a reinforced concrete casing, 3 m. in diameter, driven into the ground by the described low-frequency vibrating machine is of the same shape as the plate-casing of 9.3 m. in length.

Figure 8:
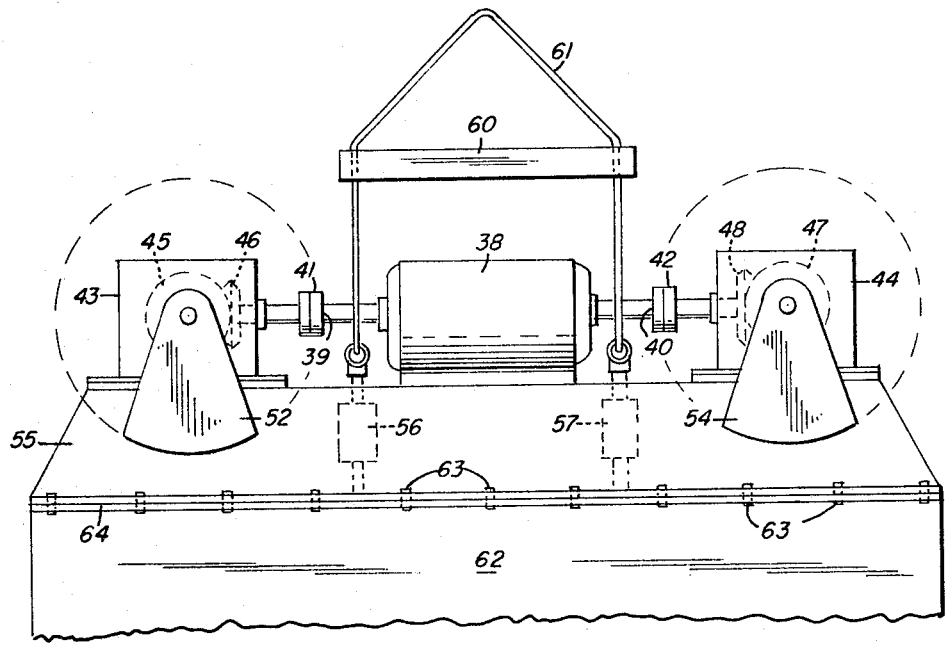
FIG. 8 is an elevational view of the machine of a low-frequency machine designed for driving thin-wall plate-casings into the soil.
Figure 9:
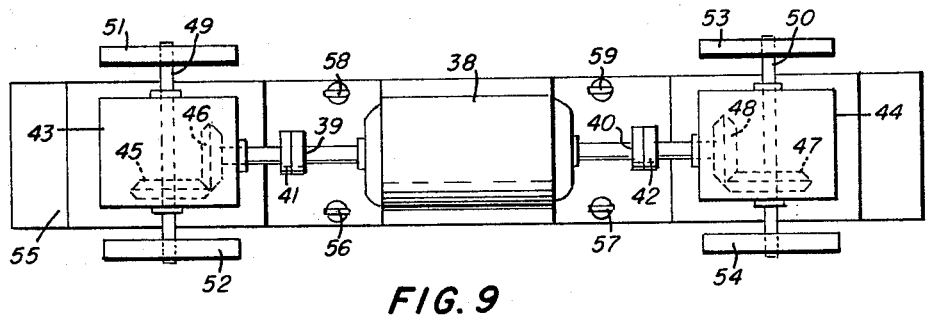
FIG. 9 is a plan view of the machine of FIG. 8.
Figure 10:
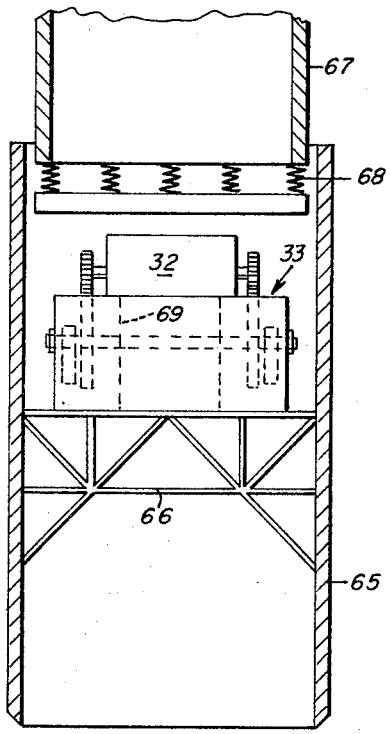
FIG. 10 is an elevational view of a shield for sinking vertical mine shafts driven into the soil by the vibrating machine shown in FIGS. 5–7, the view being partly in cross section.
Figure 12:
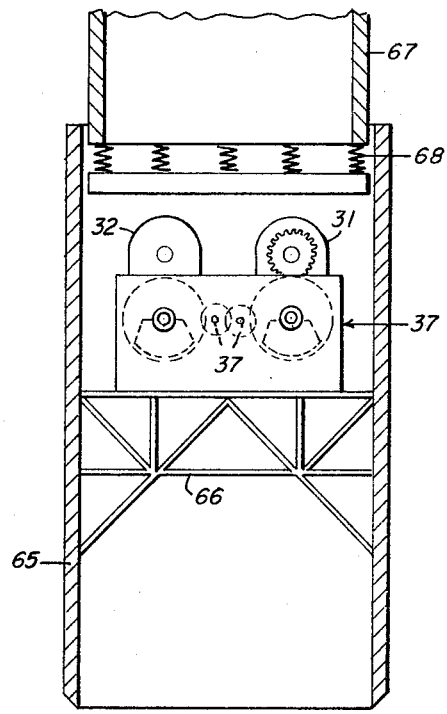
FIG. 12 is an end view partly in cross section of FIG. 10.
Figure 11:
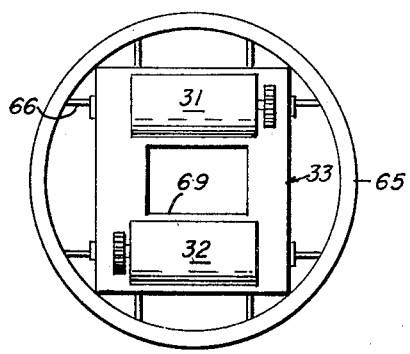
FIG. 11 is a plan view of FIG. 10.
Figure 13:
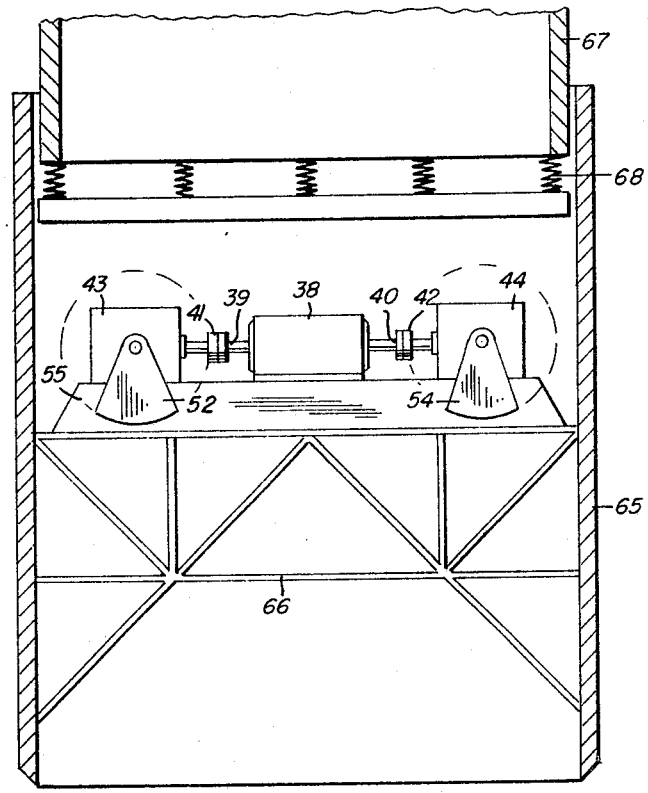
FIG. 13 is an elevational view of a shield for sinking vertical mine shafts driven into the soil by the vibrating machine shown in FIGS. 8 and 9, the view being partly in cross section
Figure 14:
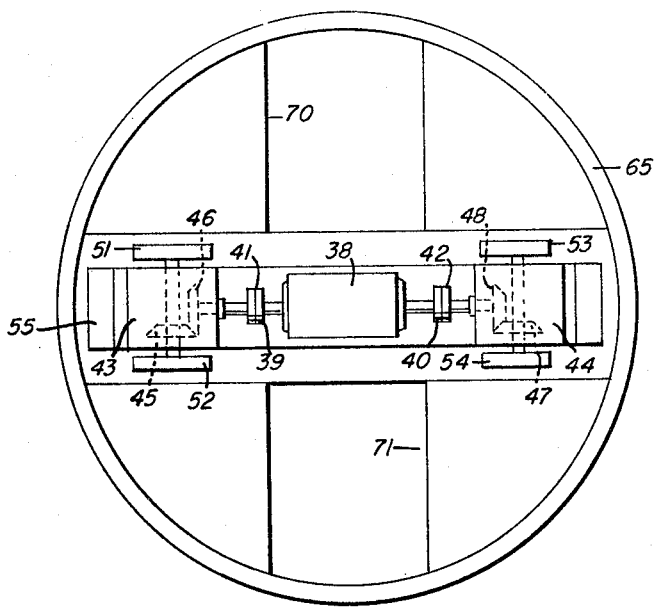
FIG. 14 is a plan view of FIG. 13.

The constructional embodiment of the described low-frequency (resonance) vibrating machine for the driving into the ground of thin-walled plate-casings is shown in FIGS. 8 and 9. It is characterized by the fact that the frequency of rotation of its eccentrics is assumed to be 4 to 5 c.p.s. It is done for the purpose of utilizing the resonance phenomenon. Using the formula referred to above for the sake of approximate estimation of the natural frequency of the plate, as a solid in the soil medium, the natural frequency of the system (vibrating machine and casing-plate) taking into account its weight and properties of the soil is assumed to be from 4 to 5 c.p.s.

The vibrating machine for driving plate-casings consists of an electric motor 38 with a shaft extending from each end thereof. The shaft ends 39 and 40 of the electric motor are connected by couplings 41 and 42 with two gear reducers 43 and 44 respectively. The gear reducers have two bevel gears 45, 46 and 47, 48 respectively. Eccentrics 51, 52 and 53, 54 are fixed on the projecting parts of shafts 49 and 50 of the gear reducers. The electric motor and gear reducers are located and fastened on a common bed plate 55 of the vibrating machine. The bed plate carries four shock absorbers 56, 57, 58 and 59 which serve to eliminate the influence of vibrations of the system which may be transmitted to the crane leaders through crosspiece 60 and slings 61. The leader while plate 63 is being driven into the ground keeps the bed plate in a vertical position. The bed plate 55 is fastened to the plate-casing 62 by dowels 63 whose ends are welded to the working fittings of the casing.

In order to match the opening in the bed plate 55 with the extending ends of the dowel joints on the plate-casing, there is provided an intermediate template plate 64.

The vibrating machine as shown in FIGS. 8 and 9 may also be used for driving into the soil thin-wall cylinder-casings, provided it is fixed over the diameter of the casing.

The objectives of the industry include also the construction of vertical mine shafts of various application. Such undertakings in loose soils are often effected with the help of dewatering, freezing or under compressed air (caisson method). Usually it is required to construct very deep mine shafts. The utilization of the vibrating machine for these purposes is limited not only by the weight of the sunk structure but also by the frictional forces which increase on the outer surface of the casing the deeper the casing penetrates into the soil. In this connection, it is expedient to utilize the vibrating machine in the bottom part of the mine shaft under construction. For this purpose the vibrating machines shown in FIGS. 5-9 for driving into the ground of cylindrical or flat plate-casings should be mounted within a metal or reinforced concrete jacket 65 (see FIGS. 10-14) which would serve as a casing for the vibrating shield and would operate as is the case of sinking mine shafts of great depth. The vibrating machine is fixed on lattice structures 66 inside the jacket 65. The fastening of walls of the mine shafts above the vibrating shield is effected by tubing 67. The weight of this lining, during the first stage of operation of the shield, is registered by the shield proper through flexible supports 68.

The construction of a mine shaft with the help of a vibrating machine under complex hydrogeological conditions is effected in accordance with the telescopic method. The height of the casing of the vibrating shield depends on the necessity of covering the soil layers saturated with water.

The vibrating shield consisting of a vibrating machine for the lowering into the ground of thin-wall cylinders (shown in FIGS. 10-12) embodies one central opening 69 designed for the excavation of soil and for the lowering and raising of workmen from the shield chamber.

The vibrating shield consisting of a vibrating machine for sinking into the soil of plate-casings (shown in FIGS. 13 and 14) includes two side manholes 70 and 71 which may be used separately for the lowering and raising of workmen and loads.

I claim:

1. A vibrating electro-mechanical mechanism of vertically directed action for driving members such as piles, rods, thin-walled casings and large-size plates, comprising a body, means for rigidly connecting the body to the head of the member to be driven, a horizontally disposed electric motor rigidly mounted on the body, a shaft for the motor, a first pair of horizontal rotatable shafts mounted in spaced parallel relationship within the body, a second pair of horizontal rotatable shafts mounted in spaced parallel relationship within the body below said first pair of shafts, a drive transmission means including a reduction gear operably coupled to the motor shaft and to the first and second pairs of shafts for rotating the pairs of shafts in opposite directions and at similar speed, eccentric weights secured to each pair of shafts, said eccentric weights being disposed symmetrically about the vertical axis extending through the center of gravity and one of the axes of symmetry of the member in plan and having equal static moments in relation to the center lines of the shafts with the inertia plane of the weights being parallel to the axis of rotation of the weights, said eccentric weights rotating in the same directions and speed as said shafts in the same vertical plane, the machine utilizing the resonance effect to impart to the member to be driven forced vibrations of 3-7.5 cycles per second which is the equivalent of the natural frequencies of said body, motor, pairs of shafts, drive transmission means, eccentric weights and the member to be driven under varying conditions, and the static moment of the eccentric weights about the shafts achieving an amplitude of forced vibrations in idling from 1-3 cm.

2. A vibrating electro-mechanical mechanism as claimed in claim 1 for use in constructing deep shafts, further including an open ended casing within which said body is mounted.

3. A vibrating electro-mechanical mechanism of vertically directed action for driving thin-walled cylindrical casings, comprising a body, means for rigidly connecting the body to the head end of the casing to be driven, a horizontally disposed electric motor rigidly mounted on the body, a shaft for the motor, a first pair of horizontal rotatable shafts mounted in spaced parallel relationship within the body, a second pair of horizontal rotatable shafts mounted in spaced parallel relationship within the body below said first pair of shafts, a drive transmission means including a reduction gear operably coupled to the motor shaft and to the first and second pairs of shafts for rotating the pairs of shafts in opposite directions and at similar speed, eccentric weights secured to each pair of shafts, said eccentric weights being disposed symmetrically about the vertical axis extending through the center of gravity and one of the axes of symmetry of the casing in plan and having equal static moments in relation to the center lines of the shafts with the inertia plane of the weights being parallel to the axis of rotation of the weights, said eccentric weights rotating in the same directions and speed as said shafts in the same vertical plane, the machine utilizing the resonance effect to impart to the casing to be driven forced vibrations of 3-5 cycles per second in dependence on the weight and cross section of the casing and the soil properties, and the static moment of the eccentric weights about the axes of the shafts achieving an amplitude of forced vibrations in idling from 1-3 cm.

4. A vibrating electro-mechanical mechanism of vertically directed action for driving casings, comprising a body, means for rigidly connecting the body to the head end of the casing to be driven, an electric motor rigidly mounted on the body, said motor having shafts extending from the respective ends thereof, a pair of horizontal rotatable shafts mounted in spaced parallel relationship on the body on the same horizontal level with the motor shafts and extending perpendicularly to said motor shafts, a drive transmission means including a reduction gear operably coupled to the motor shafts and the pair of shafts for rotating said pairs of shafts in opposite directions and at similar speed, a pair of eccentric weights secured to each pair of shafts, said eccentric weights being disposed symmetrically about the vertical axis extending through the center of gravity and one of the axes of symmetry of the casing in plan and having equal static moments in relation to the center lines of the shafts with the inertia plane of the weights being parallel to the axis of rotation of the eccentric weights, said eccentric weights rotating in the same directions and speed as said shafts in the same vertical plane, said machine utilizing the resonance effect to impart to said casing forced vibrations of 3–5 cycles per second in dependence on the weight and cross section of the casing and the soil properties and the static moment of the eccentric weights about the shaft axes being adapted to achieve an amplitude of forced vibrations in idling from 3–7 cm.

References Cited by the Examiner

UNITED STATES PATENTS

| | | | |
|---|---|---|---|
| 2,102,603 | 12/1937 | Pinazza | 175—55 |
| 2,407,471 | 9/1946 | Burk. | |
| 2,671,262 | 3/1954 | Kuniholm. | |
| 2,743,585 | 5/1956 | Berthet et al. | 175—55 |
| 2,786,688 | 3/1957 | Ineichen. | |
| 2,867,984 | 1/1959 | Desvaux et al. | 175—55 |
| 2,975,846 | 3/1961 | Bodine | 175—19 |
| 2,990,022 | 6/1961 | Muller et al. | 175—55 |
| 3,008,528 | 11/1961 | Berthet et al. | 175—55 |
| 3,023,820 | 3/1962 | Desvaux et al. | 175—55 |
| 3,054,463 | 9/1962 | Bodine | 175—19 |
| 3,100,382 | 8/1963 | Muller | 175—19 X |
| 3,101,956 | 8/1963 | Muller | 175—56 X |

FOREIGN PATENTS

| | | |
|---|---|---|
| 529,695 | 7/1954 | Belgium. |
| 1,131,102 | 2/1957 | France. |
| 118,227 | 4/1953 | Russia. |

CHARLES E. O'CONNELL, *Primary Examiner.*

BENJAMIN BENDETT, JACOB L. NACKENOFF, *Examiners.*

D. FAULCONER, R. E. FAVREAU, *Assistant Examiners.*

UNITED STATES PATENT OFFICE
CERTIFICATE OF CORRECTION

Patent No. 3,280,924  October 25, 1966

Boris Pavlovich Tatarnikov

It is hereby certified that error appears in the above numbered patent requiring correction and that the said Letters Patent should read as corrected below.

In the heading to the drawings Sheets 1 to 5, line 1 thereof, for "T. B. PAVLOVICH", each occurrence, read -- B. P. TATARNIKOV --; lower right-hand side of the drawings, for "TATARNIKOV B. PAVLOVICH", each occurrence, read -- BORIS PAVLOVICH TATARNIKOV --; in the heading to the printed specification, line 5, for "Tatarnikov Boris Pavlovich" read -- Boris Pavlovich Tatarnikov --.

Signed and sealed this 24th day of October 1967.

(SEAL)
Attest:

Edward M. Fletcher, Jr.
Attesting Officer

EDWARD J. BRENNER
Commissioner of Patents